No. 725,073. PATENTED APR. 14, 1903.
G. M. GOUYARD.
SURVEYING INSTRUMENT.
APPLICATION FILED MAY 27, 1902.
NO MODEL. 2 SHEETS—SHEET 1.

Witnesses: Inventor:
G. Sargent Elliott Gustave M. Gouyard.
Joseph Wilkinson By H. S. Bailey, Attorney.

No. 725,073. PATENTED APR. 14, 1903.
G. M. GOUYARD.
SURVEYING INSTRUMENT.
APPLICATION FILED MAY 27, 1902.
NO MODEL. 2 SHEETS—SHEET 2.
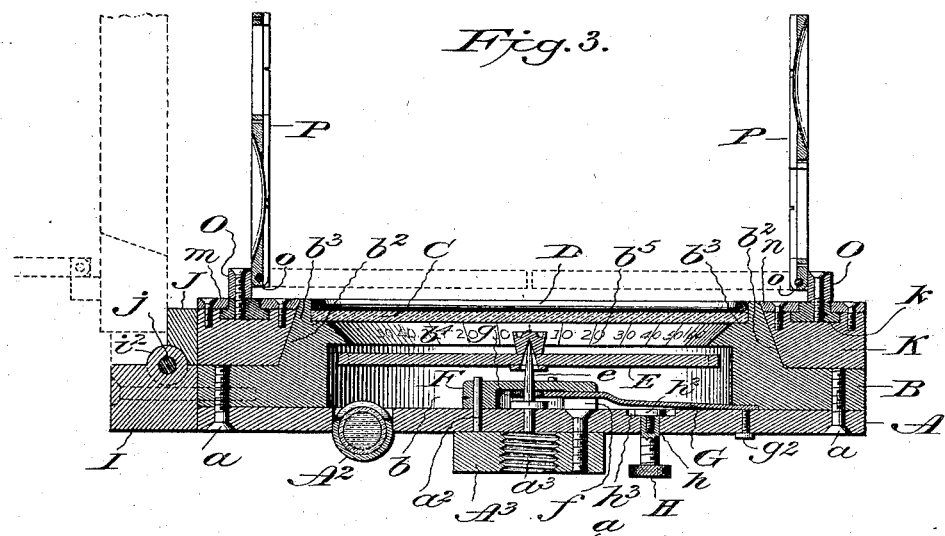
Fig. 3.
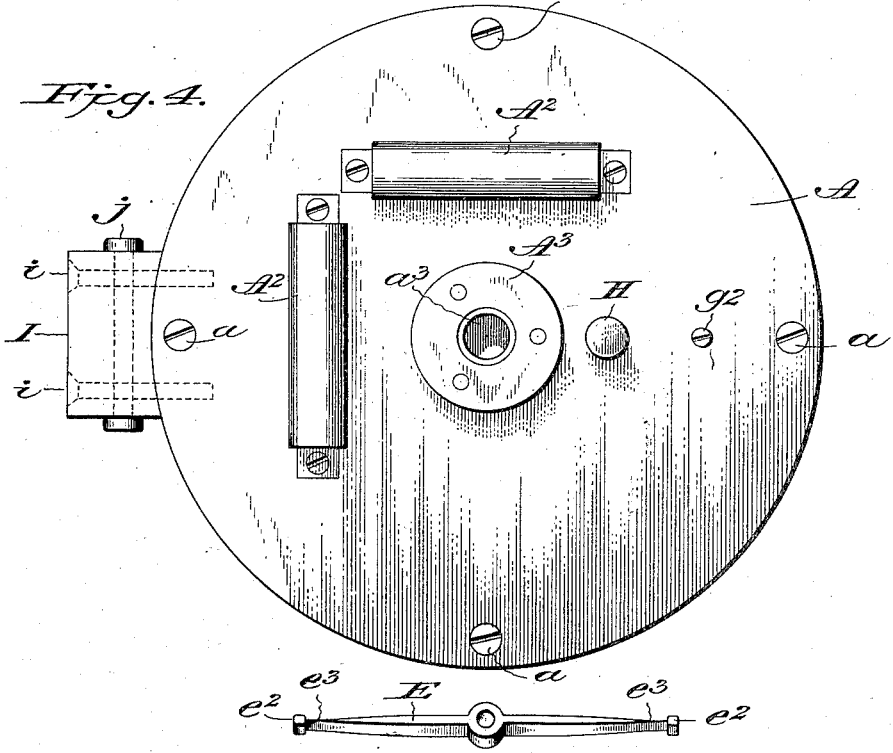
Fig. 4.
Fig. 5.
Witnesses:
G. Sarguit Elliott
Joseph Wilkinson
Inventor:
Gustave M. Gouyard.
By
H. S. Bailey Attorney.

UNITED STATES PATENT OFFICE.

GUSTAVE M. GOUYARD, OF DENVER, COLORADO.

SURVEYING INSTRUMENT.

SPECIFICATION forming part of Letters Patent No. 725,073, dated April 14, 1903.

Application filed May 27, 1902. Serial No. 109,194. (No model.)

*To all whom it may concern:*

Be it known that I, GUSTAVE M. GOUYARD, a citizen of the United States of America, residing at Denver, in the county of Arapahoe and State of Colorado, have invented certain new and useful Improvements in Surveying Instruments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in surveying instruments, and particularly to that class of instruments adapted for use in surveying and in mining and other engineering work.

The object of the invention is to provide an instrument of this character which is provided with a graduated circle-plate in hinged engagement with the body portion or that part carrying the needle and levels, the said graduated circle-plate when swung back to the limit of its movement being designed to stand at an angle of exactly ninety degrees to the main portion of the instrument, which is secured upon the usual tripod.

The graduated circle-plate is provided with a revoluble ring to which are secured the sights, and when the said plate is swung back the instrument is adapted for ascertaining vertical angles and variations thereof, while when the plate is in its closed or horizontal position the instrument is adapted for ascertaining horizontal angles and variations thereof.

Another object of the invention is to provide an improved needle-lifter by which the needle may be lifted from its pivot, raised in a true vertical position, and clamped against the under side of the inner graduated circle-plate, so that an accurate reading may be had or so that the needle may be held immovable when the instrument is being carried from place to place.

The invention further consists in the novel arrangement and combination of parts, as will be set forth in the accompanying specification and claims.

Figure 1:
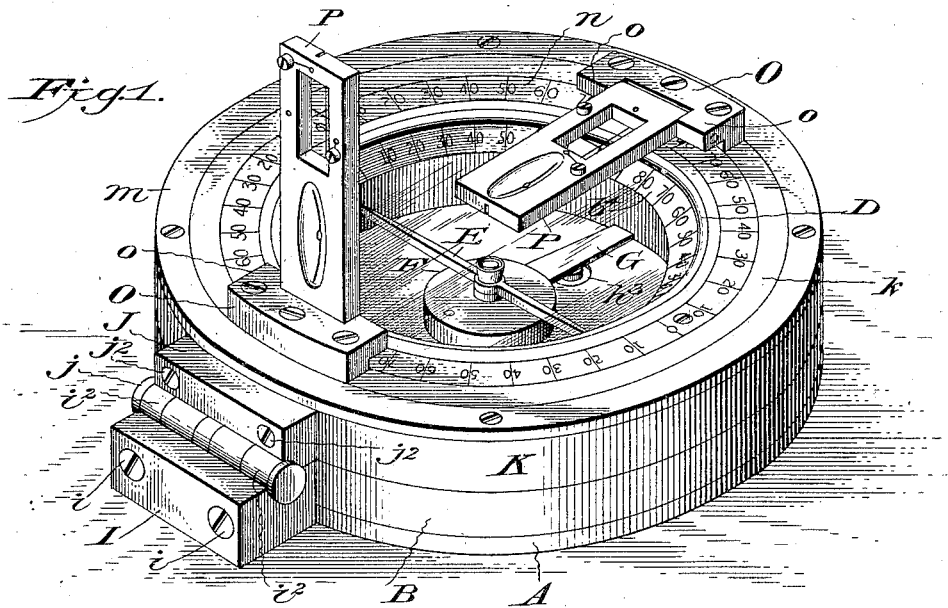
Figure 2:
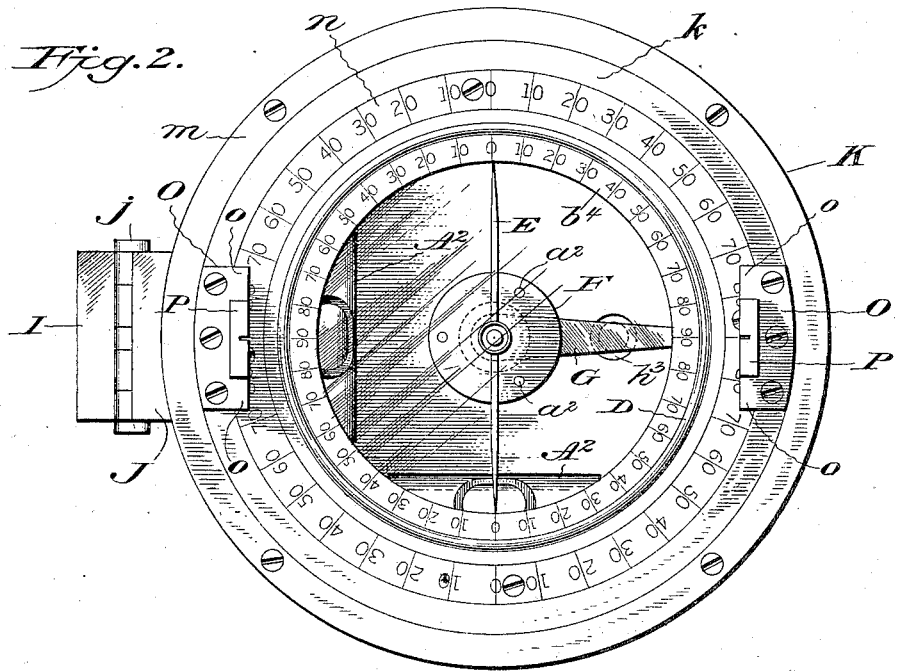

In the accompanying drawings, Figure 1 is a perspective view of the improved surveying instrument, one of the sight-arms being in an inoperative or horizontal position. Fig. 2 is a plan view of the same. Fig. 3 is a longitudinal vertical sectional view, the hinged plate carrying the revoluble ring and sight-arms being shown raised in dotted lines. Fig. 4 is a bottom plan view of the surveying instrument, and Fig. 5 is a perspective view of the compass-needle used in connection with this device.

Referring to the accompanying drawings, the letter A refers to a circular metallic plate which forms the base or bottom of the surveying instrument. To this plate is secured by screws $a$ a ring B, the outer diameter of which is the same as that of the plate A. The opening or bore $b$ of this ring forms a housing for a magnetic needle E, as will more fully hereinafter appear. The metal surrounding the bore $b$ is extended vertically a suitable distance, and the outer periphery of this extended portion $b^2$ tapers or is conical, as is clearly shown in Fig. 3. An annular shoulder $b^3$ is formed in the upper part of the extension $b^2$, upon which rests the ordinary protecting glass or crystal C, the said crystal being retained against accidental displacement by a circular expansion-spring D, which rests upon the said crystal and impinges laterally against the metal surrounding the same. From the annular shoulder $b^3$ extends a conical or tapered bore $b^4$, which opens into the main bore or housing $b$. The periphery of the bore $b^4$ is marked off into three hundred and sixty degrees, (360°,) and the lower portion, or that communicating with the main bore or housing $b$, being of less diameter than the said housing forms an inwardly-projecting annular lip $b^5$, beneath which the ends of the needle E move and against which the said needle is clamped, as will now be fully set forth.

The base-plate A is provided centrally with a threaded aperture into which is screwed a pin $e$, upon which the needle E is poised. The pin $e$ extends centrally through a hollow circular disk F, which normally rests upon the plate A, a slight space intervening between the said disk and the needle. The disk F is provided at equidistant points with vertical apertures, preferably three, through which extend pins $a^2$, which are rigidly secured in the base-plate A. These pins $a^2$ form guides which limit the disk F to a true vertical movement, as will be shown. The periphery of the disk is cut away at one point, as shown at $f$, so as to form an opening which leads into the hollow interior of the said disk, and through this opening passes one end of a spring-arm G, which end is provided either with a slot or an elongated hole $g$, which surrounds the pin $e$. The other end of this spring-arm enters a notch in the periphery of the housing $b$, where it is securely clamped by a screw $g^2$, which passes through the base-plate A. Beneath the spring-arm G and about centrally of its length the base-plate is provided with a threaded aperture $h$, which receives the shank of a thumb-screw H. The end of this screw H has a threaded bore which receives the shank of a small screw $h^2$, having a head which is wider than the diameter of the shank of the said screw H, and the head of screw $h^2$ forms a stop which prevents the screw H from becoming detached from the base-plate A. The head of the screw $h^2$ normally lies within a countersink $h^3$ in the upper face of the base-plate, so as to be flush with the said face and out of contact with the spring-arm G; but when the screw H is turned the free end of spring-arm G will be forced upward, carrying with it the disk F, which is guided by the pins $a^2$ so as to move in a true vertical direcction, and the said disk will contact with the under side of needle E, lift the same, and clamp its ends against the lip $b^5$. By this means an accurate reading of the compass may be had, as the needle is lifted vertically and clamped in the exact position at which it ceased to vibrate. The needle is clamped in like manner when the surveying instrument is carried from place to place, as will be understood.

The needle E is of the form shown in Fig. 5 and is provided at each end with a head $e^2$, which is of greater width than the body of the needle. These heads $e^2$ are perfectly flat on their upper sides and are designed to contact with the lip $b^5$ as the needle is lifted, thus forming a bearing-surface which will prevent the needle from moving or turning as the same is clamped. At the point of union of each head $e^2$ with the needle E the upper side of said needle is brought to a knife-edge $e^3$, which extends a short distance from the head of the needle and then gradually broadens out, as shown. When the needle is clamped, an exact reading may be had, as the knife-edges will determine the slightest fraction of the degree at which the needle stands. Secured to one side of the ring B by screws $i$ is a block I, having on its upper side hinge-ears $i^2$, by which the said block is hinged to a second block J by means of a pintle $j$.

The block J is secured by screws $j^2$ to a ring K, which rests upon and is of the same diameter as ring B, the inner periphery of this ring K being conical or tapered, as shown, so as to closely fit the conical projection $b^2$ of the said ring B.

In the upper side of the ring K is formed an annular groove or channel in which lies an ordinary revoluble ring $k$, which is retained in the said channel by an outer ring $m$ and an inner graduated ring $n$, but which permit the revoluble ring to slide in the said channel at the will of the operator.

At two diametrically opposite points on the revoluble ring a block O is secured by screws, as shown, the said blocks each being provided with a pair of ears $o$, between which is hinged an ordinary sight P, each sight being provided with a peep-hole and cross-wires, the peep-hole in one sight being on a level with the cross-wires in the other arm, as will be understood. When not in use, these sights P are folded down (dotted lines, Fig. 3) and lie horizontally, so as to be out of the way; but when the instrument is in operation the sights are raised to a vertical position and are prevented moving past a vertical line by contacting at their lower ends with the vertical faces of the blocks O between the ears $o$. In this position the surveying instrument is used to ascertain horizontal angles and variations thereof, the revoluble ring to which the sights are secured being moved to meet the requirements of the case; but when it is desired to ascertain vertical angles and variations thereof the ring K is swung on its hinge to a vertical position, when the hinge-block J will rest squarely upon the hinge-block I, and the meeting faces of these blocks are so perfectly trued that the ring K will stand at an angle of exactly ninety degrees to a horizontal plane. The sights are employed as before and the revoluble ring may be turned to any required angle.

The base-plate A is provided with a pair of ordinary levels or bubble-tubes $A^2$, which are set at right angles to each other and which will determine when the surveying instrument has been adjusted to lie on a horizontal plane.

A circular lug $A^3$, having a threaded bore $a^3$, is secured centrally to the under side of the base-plate A, and by this means the surveying instrument is secured upon an ordinary tripod, as will be fully understood.

The improved surveying instrument herein described is not only simple in construction, but when properly adjusted and manipulated is capable of the most accurate results. The hinged ring carrying the revoluble ring and sights is a great improvement over the instruments now in use, as when the surveying instrument has been adjusted for ascertaining horizontal angles it is only necessary to raise the said ring to a vertical position, when vertical angles may be taken without readjusting the instrument or interfering with the needle.

Having fully described my invention, what I claim as new, and desire to secure by Letters Patent, is—

1. A surveying instrument of the character described, consisting of a body portion having a needle-chamber, a magnetic needle poised in said chamber, and means for raising the same vertically and clamping it in a fixed position; a degree-circle located in the top of said chamber above the said needle and bubble-tubes located in the bottom thereof; a ring which normally rests upon the said body portion and is hinged thereto so as to be capable of a vertical, as well as a horizontal position, the said ring carrying a degree-circle, and a revoluble ring having sights secured thereto; and means for limiting the ring, when raised to a true vertical position, substantially as shown.

2. In a surveying instrument, a body portion having a needle-chamber; bubble-tubes located in the bottom of said chamber, and a degree-circle in the form of an inwardly-projecting annular rim located at the top thereof; a magnetic needle, the ends of which lie beneath the said rim, and means for raising the said needle vertically and clamping it against the said rim; a ring hinged upon the upper side of the said body portion, the said ring being provided with a degree-circle, and with a revoluble ring to which is secured a pair of folding sights, means being employed for limiting the ring, when raised, to a vertical position; and means for securing the surveying instrument to a tripod, substantially as shown.

3. In a surveying instrument, the combination of a body portion having a needle-chamber, at the top of which is a degree-circle in the form of an inwardly-projecting annular rim; a needle, each end of which is formed into a head which lies directly beneath the said annular rim; a disk centrally beneath said needle, and means for raising the said disk so as to lift the said needle from its pivot and clamp its headed ends against the annular rim; a ring in hinged engagement with said body portion, the said ring being provided on its upper face with a degree-circle and with a revoluble ring to which is secured a pair of hinged sights, and with means for limiting its upward movement to a true vertical position; bubble-tubes carried by the body portion and a lug having a threaded bore secured centrally upon the bottom of said body portion, by which the surveying instrument may be attached to a tripod, substantially as shown.

4. In a surveying instrument, a circular body portion having a concentric projecting member of less diameter than the body portion, the periphery of which is conical; a ring in hinged engagement with the body portion, the inner periphery of which is conical so as to fit upon the conical member of the said body portion, the said ring being provided with a degree-circle, and with a revoluble ring upon which is secured a pair of hinged sights; a needle-chamber formed in the body portion, having at its upper end an inwardly-projecting annular rim which forms a degree-circle; a needle having headed ends which lie beneath the annular rim, and means for lifting said needle so that its ends will be clamped against the said rim; bubble-tubes carried by the body portion, and means, as a threaded lug upon the under side of the body portion for attaching the surveying instrument to a tripod, substantially as shown.

5. In a surveying instrument, a body portion having a circular, raised member of less diameter than the body portion, the periphery of which is conical, a circular chamber which is surrounded by said conical raised member; a degree-circle at the top of said chamber in the form of an inwardly-projecting annular rim; a pivot-pin secured centrally in the bottom of said chamber, a plurality of guide-pins secured around said pivot-pin, and concentric therewith; a disk having vertical holes through which the guide-pins and pivot-pins pass; a magnetic needle poised upon the pivot-pin, and so as to be slightly above the disk, said needle having headed ends which lie beneath the annular rim; a spring-arm, one end of which engages the said disk, a thumb-screw in the bottom of the body portion beneath the said spring-arm, by which the arm and disk are raised to lift the needle from its pivot and clamp the same against the annular rim; a ring hinged to the body portion, the inner periphery of which is conical so as to lie around the raised member of said body portion, the said ring having a degree-circle, and a revoluble ring to which is secured a pair of hinged sights, and being designed when raised, to stand at an angle of ninety degrees to a horizontal plane, substantially as shown.

6. A surveying instrument comprising a circular body portion having a needle-chamber; a raised conical member which forms a wall for said chamber; a ring adapted to lie upon the body portion, the inner periphery of which is conical and surrounds the raised member of the body portion; hinge connections upon the body portion and ring having meeting faces, which, when the ring is raised, will limit the same to a vertical position; the said ring being provided with a degree-circle and with a revoluble ring to which is attached a pair of hinged sights; a degree-circle which forms a projecting annular rim at the top of the needle-chamber; a needle, the ends of which are provided with heads which lie beneath the said rim; and means, as a disk, a spring-arm, and a thumb-screw for raising the said needle, and clamping its headed ends against the annular rim, substantially as shown.

7. The combination with a surveying instrument comprising a body portion having a needle-chamber, with an inwardly-extending degree-circle at its upper end, and a hinged member in the form of a ring having a degree-circle, and a revoluble ring to which is attached a pair of sights; of a magnetic needle having a laterally-projecting head at each end, adjoining which the upper edge of the said needle is reduced in thickness to form a knife-edge and means for raising said needle from its pivot, and clamping its heads against the under side of the degree-circle, consisting of a vertically-movable disk, a spring-arm engaging said disk and a thumb-screw for raising said arm and disk, substantially as shown.

8. The combination with a surveying instrument comprising a body portion having a needle-chamber with an inwardly-extending degree-circle at its upper end; a needle having a laterally-extending head at each end; adjoining which the thickness of the needle is reduced to a knife-edge, the said heads lying immediately beneath the said degree-circle; and a hinged member in the form of a ring having a degree-circle and a revoluble ring to which is attached a pair of sights; of a lifter for said needle consisting of a vertically-movable disk immediately beneath the needle, a spring-arm, one end of which engages the said disk, while the other end is stationary, and a screw which enters the needle-chamber beneath the spring-arm and is adapted to contact with the said arm, the said screw being retained against accidental displacement by receiving in its upper end, a screw whose head is of greater diameter than the shank of the aforesaid screw, substantially as shown.

9. In a surveying instrument, a magnetic needle having a head portion at each end, the top surfaces of which are perfectly flat and in alinement with each other, substantially as described.

10. In a surveying instrument, a magnetic needle having a head portion at its opposite ends provided with perfectly flat surfaces in perfect alinement, and a knife-edge portion adjacent to said head portions, substantially as described.

11. In a surveying instrument, a suitable needle-chamber, a magnetic needle operatively mounted in said chamber, an introverted circular portion at the top portion of said needle-chamber arranged to extend over the ends of said needle and provided with a graduated, diverging, conical surface extending to the edge of said introverted circular portion, enlarged head portions on the opposite ends of said needle provided with flat, true surfaces on their upper ends arranged in alinement, a knife-edge portion on said needle adjacent to each of said enlarged head portions, and means for raising said needle against said introverted circular portion of said chamber, whereby its head portions are clamped against the under side of said introverted portion of said chamber and the sharp edges of its knife-edge portions register against the ends of the graduations of said diverging circular, conical portion of said needle-chamber, substantially as described.

12. In a surveying instrument, the combination with a suitable needle-chamber, a pivotal pin axially secured in said chamber, a plurality of pins surrounding said pivotal pin and arranged to extend vertically upward from the bottom of said needle-chamber, a magnetic needle operatively mounted on said needle, a disk loosely mounted on said pivotal pin and slidably mounted on said vertical pins between said needle and the bottom of said needle-chamber, and normally resting on the bottom of said needle-chamber, and means including a thumb-screw for raising said disk vertically to raise said needle from its pivotal pin, substantially as described.

13. In a surveying instrument, the combination with the needle-chamber and the pivotal needle-pin, of a magnetic needle operatively poised within said chamber on said pivotal pin, pins adjacent to the pivotal needle-pin extending vertically upward from the bottom of said chamber, a disk mounted loosely on said needle-pin and slidably on said pins, a hollow chamber in said disk, a spring-blade secured at one end to the bottom of said chamber having its opposite end arranged to extend into the chamber of said disk and surround loosely said needle-pin and engage the top of the chamber of said disk, and arranged with a resilient tension to normally hold said spring-blade in a position of disuse, and means including a thumb-screw attached to the bottom of said chamber and to an introverted portion at the top of said chamber above said needle and overhanging its ends for raising said spring-blade and said disk and also said needle from said needle's pivotal pin, and to lock said needle in a position of disuse against the introverted portion of said chamber above said needle, substantially as described.

14. In a surveying instrument, the combination with a magnetic-needle chamber having an integral floor portion and an overhanging or introverted circular portion forming a flat roof portion at the top of the chamber on its under side, and a pivotal needle-pin secured at its axial center, of a magnetic needle operatively mounted on said pivotal pin having its opposite ends extend under said introverted portion of said chamber, an enlarged end portion at each end of said needle having their upper surfaces flat and level and in alinement with each other, a knife-edge portion adjacent to said enlarged end portions having their sharp edges uppermost and arranged to register with the inner peripheral edge of said chamber's introverted portion, and means including a slidable sleeve loosely mounted on said pivotal pin and spring-controlled in one direction of its movement for vertically raising said needle from said pivotal pin and locking it against the under side of said introverted portion of said needle-chamber, substantially as described.

15. In a surveying instrument, a suitable supporting-base provided with a needle-holding chamber having a circular degree-circle surrounding said chamber, a magnetic needle operatively mounted in said chamber, and a ring mounted on said base to surround concentrically the said needle-chamber and degree-circle and pivotally hinged thereto to swing up into a vertical plane and means including right-angled surfaces connected to said supporting-base and to said ring for defining the swinging movement of said ring to a vertical angle at exactly right angles to the plane of said needle-chamber and needle, a degree-circle in the top of said ring, a circular rotatable revoluble ring in the top of said ring and suitable peep-sights secured at opposite sides of said revcluble ring and arranged to swing from horizontal into exactly vertical positions relative to the plane of said needle-chamber and needle, substantially as described.

In testimony whereof I affix my signature in presence of two witnesses.

GUSTAVE M. GOUYARD.

Witnesses:
G. SARGENT ELLIOTT,
BESSIE THOMPSON.